Sept. 14, 1926.
R. BARSAM
1,599,805
MECHANICAL ALMOND COOKER
Filed May 4, 1925
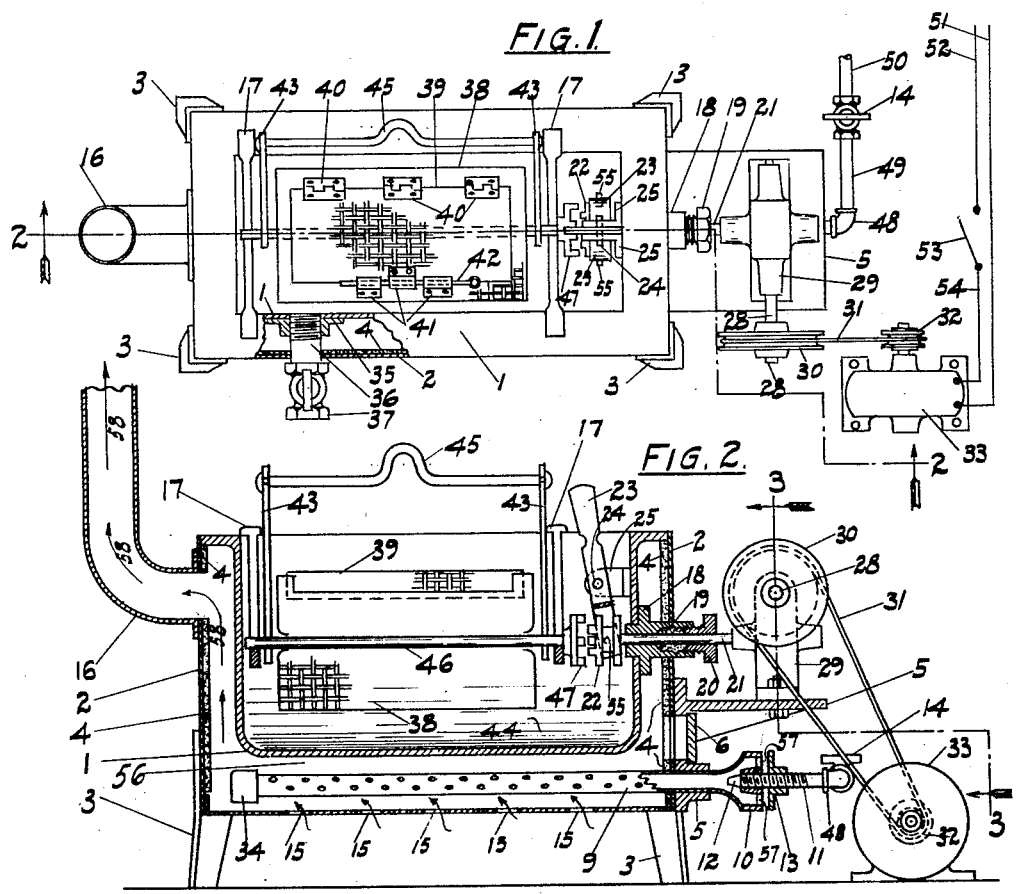
FIG.1
FIG.2
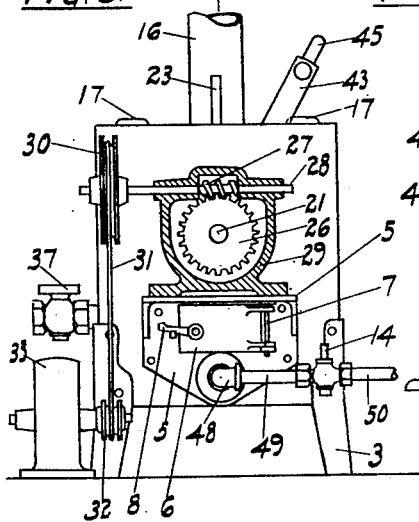
FIG.3
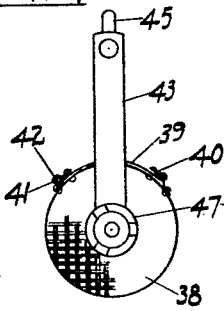
FIG.4
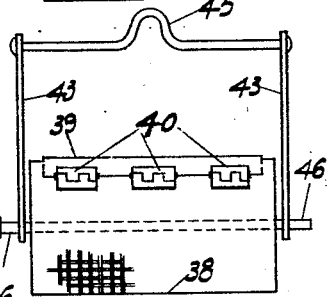
FIG.5
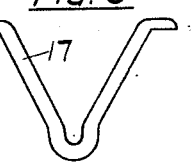
FIG.6
INVENTOR
Rens Barsam Patented Sept. 14, 1926.

1,599,805

UNITED STATES PATENT OFFICE.

RENE BARSAM, OF LOS ANGELES, CALIFORNIA.

MECHANICAL ALMOND COOKER.

Application filed May 4, 1925. Serial No. 27,933.

This invention relates to certain new and useful improvements in devices appertaining to the manner of cooking and treating shelled almonds.

The present invention has for its objects, among others, to provide a simple and efficient device whereby the cooking of almonds is accomplished mechanically and in such a manner as to render them eatable and assure a greater palatability over similar contrivances now in use and contributing to the same end.

By the use of my improved device any possibility of scorching, burning, gumming and sticking together of the almonds is eliminated and a more uniform curing and extraction of the water contained in the almond is accomplished through the uniform rotation of the almond container, which revolves in a vegetable oil or fat, the heat under which being kept constant, assures a gradual permeation of the liquid through the almond and finally leaves a flavor free from any rancid taste whatsoever.

It is absolutely dependable in its action, durable, composed of few parts, those readily assembled and not liable to get out of order.

It will effect a great labor saving and will aid materially in producing a delicacy which will at all times assure a perfect savor and possess an appetizing quality.

Other objects and advantages will hereinafter appear and the novel features thereof will be specifically defined by the appended claims.

The invention, in its preferred form, is clearly illustrated in the accompanying drawing which, with the reference numerals marked thereon, form a part of this specification, and in which—

Figure 1 is a plan view of my improved cooker.

Figure 2 is a vertical section, as on the line 2—2 of Figure 1, looking in the direction of the arrows showing the mixer in section.

Figure 3 is a vertical section, as on the line 3—3 of Figure 2, looking in the direction of the arrows.

Figure 4 is an end elevation of almond container showing the elevating handle in a vertical position.

Figure 5 is a side elevation of almond container shown in Figure 4.

Figure 6 is a detail of one of the supporting brackets for almond container.

Like numerals of reference indicate like parts throughout the several views.

Referring to the drawing:

The main structure of my improved mechanical almond cooker is comprised of an outer housing, 2, supported by legs 3, and an inner receptacle or container 1, the combination forming a heating chamber 56 into which is projected a perforated gas pipe 9, one end being closed with a cap 34, the other end 10 being upset to accommodate the insertion of an inlet pipe 11 with a tapered nozzle 12 and being threaded in order to regulate the flow of air through ports 57 by screwing the flange 13 on the threaded portion thereof. The gas supply is regulated by a valve 14 placed between the fuel supply pipes 49 and 50 and connected to inlet pipe 11 by an elbow 48. Either liquid or gaseous fuel may be used with the heater and in either case the necessary type of burner would be employed.

In the bottom portion of the outer housing 1, and directly underneath the perforated gas burner 9, are a number of air vents 15, through which air enters and increases the draft thereby forcing the escaped gases through the outlet flue 16 as shown by direction arrows 58. Said flue may connect with any other appropriate flue or chimney leading to the outside.

The entire inner surface of the outer housing walls 2 are covered by a suitable heat insulating material 4 of asbestos or the like, to the end that the heating contents of the heater may be conserved.

A door 6 is hingedly mounted, as at 7, having a latch 8, thus giving access to the interior of the heater as shown.

Upon the front portion of the outer housing 2 is mounted a bracket 5 into which is framed the door 6, the bracket supporting a gear housing 29 inside of which is framed a special reducing worm wheel 26 and worm 27.

The worm is mounted upon a shaft 28 and connects to a motor 33 through pulley 30 and 32 by belt 31.

Within the receptacle 1 and placed near the ends thereof are two supporting V-shaped brackets 17, their ends being made to lip over the sides of the receptacle 1 and having their V-shaped sides converging into rounded portions, which are designed to support the shaft 46 upon which the cylindrical shaped almond container 38 is mounted and which serve as bearings for the shaft 46.

Upon the forward end of said shaft 46 is keyed a clutch 47 which is made to engage a clutch 22, mounted on shaft 21.

The shaft 21 is supported at one end by a stuffing box 18 containing a packing compound 19 and held in place by a flange 20, screwed into the end of the stuffing box.

The other end of shaft 21 is supported by the gear housing containing a worm and worm-wheel through which the speed of the motor is greatly reduced in order to allow the almond container to rotate at a very slow speed.

Directly over the clutch 22 and 47 and engageable to clutch 22 by pins 55 is a clutch lever 23, pivoted at 24 by a bolt and supported by brackets 25 fastened to the receptacle 1.

The clutch lever 23 is in the form of a Y, having the forked ends thereof made to encircle the clutch 22 and in the extreme ends of the Y are two pins 55 which engage the grooved portions of clutch 22 so as to move it back and forth on a key inserted in shaft 21, whenever it is desired to start or stop the rotation of the almond container.

The almond container is composed of a cylindrical wire netting frame having a door 39 hingedly at 40 and which is opened and closed by pin 42 engaging pin holders 41.

When it is desired to remove the almond container from the receptacle, the elevating bar 45 is swung into a vertical position by means of supporting bars 43 which are pivotally located at shaft 21, the elevating bar being bent so that the almond container will always assume a horizontal position, when suspended from that point.

Contained within the receptacle 1 is a vegetable oil 44 in which the almond container rotates. This oil is heated to a sufficient temperature to evaporate the water from the almonds and as the almond container rotates the liquid percolates through the wire netting and the almonds and with the aid of gravity keeping the almonds continuously falling over one another during the process of rotation eliminates any possibility of scorching, gumming or sticking together of the almonds during the process of cooking.

As soon as the process of treating the almonds has been accomplished, the clutch 22 is disengaged from the clutch 47 by lever 33, fulcrumed at 24 and any elevating machinery or hoist not shown here may be engaged in raising the almond container from the vat and after sufficient time for the vegetable oil to drain from the almonds, the container is rotated in its shaft and the almonds are removed through the door 39 provided therefor.

It is not required to change the vegetable oil each time a new batch of almonds is prepared for treating, but a drain composed of a valve 37, a nipple 36 and a flange 35 fastened to the receptacle is provided for when the removal of the oil is deemed necessary.

Suitable lead wires 51 and 52 connect the electric motor to any convenient source of electric power and is operable through switch 53 and connecting wire 54.

A mechanical almond cooker embodying the general principles as herein set forth has been assembled and constructed and has proven an efficient device for the purpose to which it has been ascribed.

Having thus fully described my said invention, what I claim as new and desire to secure by United States Letters Patent is:—

1. In a mechanical almond cooker, the combination of an outer casing enclosing an inner receptacle and providing a heating chamber therewith, an overhanging bracket mounted upon the forward end of said outer casing provided with a door opening giving access to said heating chamber, the aforementioned bracket supporting a housing containing a speed reducing mechanism, comprising a worm and worm wheel connected to a source of power; a pair of V-shaped brackets, said V-shaped brackets having flanged ends supported by aforementioned inner receptacle, the V-sides of each aforesaid V-shaped bracket converging into rounded portions forming a bearing; a shaft journaled in the bearings, a rotary almond container mounted for rotation with said shaft, means to connect said shaft with aforesaid source of power for rotating said container, substantially as set forth.

2. In a machine for cooking almonds, comprising a fluid chamber having an outlet for the fluid therefrom, two V-shaped brackets supported by the side walls of said fluid chamber, the V-sides of each said bracket converging into rounded portions forming a bearing, a shaft journaled in the bearings, a cylindrical wire net almond container carried by the shaft so that said container is partially immersed in said fluid during the rotation thereof and means whereby the container can be removed from said fluid chamber, all substantially as set forth.

3. In a mechanical almond cooker of the character described, a cylindrically shaped wire net almond container, axially mounted upon a driving axis, two V-shaped supporting brackets having their V sides converging into rounded portions which serve as bearings for said driving axis, a horizontally disposed inner receptacle supporting aforesaid V-shaped brackets and containing a fluid immersing a portion of aforesaid container, means for heating and regulating the supply of heat for aforesaid liquid, means for rotating aforesaid container whereby the heat from said fluid permeates the almonds during the rotation thereof and thereby evaporates the water contained in the almonds, all substantially as set forth.

4. In a mechanical almond cooker of the character described, comprising in combination an outer housing and an inner receptacle, the said inner receptacle co-operatively forming with said outer housing a horizontally disposed heating chamber, means to heat and regulate the supply of heat in said heating chamber; two V-shaped brackets supported by the side walls of aforesaid inner receptacle, a shaft journaled in the brackets, a cylindrical wire net container carried by the shaft, the said container being adapted to hold almonds during the rotation thereof and revolvable in a fluid surrounding a portion of said container, means to rotate said container, whereby the heat from said fluid permeates the almonds contained in the container during the rotation thereof, thereby evaporating the water contained in said almonds, substantially as set forth.

5. In a mechanical almond cooker of the character described, comprising in combination an outer housing and an inner receptacle, the said inner receptacle co-operatively forming with said outer housing a horizontally disposed heating chamber, means to heat and regulate the supply of heat in said heating chamber, the said inner receptacle containing a fluid subjected to heat from said heating means aforementioned; the aforesaid inner receptacle supporting two transverse V-shaped brackets having their V-sides converging into rounded portions, a horizontally disposed shaft carried in said rounded portions, a cylindrical wire net container mounted on the shaft for holding almonds during the rotation thereof and during the rotation thereof to subject a portion of the almonds contained in aforesaid container to a portion of aforesaid fluid contained in aforementioned inner receptacle, whereby the heat from said fluid permeates the almonds during their agitation, thereby evaporating the water contained therein, substantially as set forth.

6. In a mechanical almond cooker, comprising an outer housing and an inner receptacle, two parallel V-shaped brackets supported by said inner receptacle and having their V-shaped sides converging into rounded portions serving as bearings; a cylindrically shaped wire net almond container axially mounted upon a drive shaft and adapted to be rotated by said shaft mounted in said bearings connectable through a speed reducing mechanism comprising a worm and worm wheel to a source of power whereby to rotate said container, means for connecting and disconnecting said container to said source of power; the aforesaid inner receptacle serving as a vat and containing a vegetable fat for a portion of the almonds contained in said container to rotate in; means for heating and regulating the supply of heat to said fat; a bail for removing aforesaid container from said inner receptacle and a drain for draining aforesaid inner receptacle, all substantially as set forth.

7. In an almond cooker, the combination of an outer housing and an inner receptacle, the said outer housing co-operatively forming with said inner receptacle a horizontally disposed heating chamber, means to heat and regulate the supply of heat in said heating chamber, the said inner receptacle supporting two transverse V-shaped supporting brackets, a shaft journaled in the brackets, a cylindrically shaped wire net almond container, carried by the shaft, a clutch member keyed on the end of said shaft and adapted to engage a companion clutch member in direct alignment therewith; means for engaging and disengaging the same, the second named clutch member being shiftably mounted upon a driving shaft, which is supported at one end by being journaled in the end of aforesaid inner receptacle, the other end of said driving shaft having mounted thereupon a worm wheel contained in and supported by a housing, the said worm-wheel meshing with a worm mounted upon a shaft and supported by aforesaid housing, the aforesaid worm connected to a source of power, whereby, through the medium of said worm and worm wheel the operation of aforesaid container is accomplished; the aforementioned receptacle containing a liquid for a portion of the almond container to rotate in, said liquid being subjected to heat whereby the heat from said liquid is employed in extracting and evaporating the water contained in the almonds subjected to said process of treating, substantially as set forth.

8. In a mechanical almond cooker, an outer casing enclosing an inner receptacle, and providing a heating chamber therewith, a cylindrical container having a peripheral surface and ends composed of reticulated material rotative upon a substantially horizontal axis removably mounted in said inner receptacle, said cylindrical container adapted to be partially immersed in a heating treating substance with which the material contained in said cylindrical container is to be cooked during the rotation thereof and by means of this rotation to accomplish an agitation of the said material whereby a portion of the agitated particles are in constant treating with aforesaid heated treating substance, substantially as set forth.

9. In a mechanical nut-meat cooker, the combination with a heated liquid container having a driving shaft mounted for operation at one end, of brackets supported by the side walls of said container and extending downwardly therein, bearings at the lower ends of said brackets, a shaft journaled in said bearings, a clutch for connecting said shaft to said driving shaft and a nut-meat container of reticulated material carried by the shaft that is journaled in the bearings of said brackets.

10. In a mechanical nut-meat cooker, the combination with a heated liquid container having a driving shaft mounted for operation at one end, of brackets supported by the side walls of said container and extending downwardly therein bearings at the lower ends of said brackets, a shaft journaled in said bearings, a bail connected to said shaft, a clutch for connecting said shaft to said driving shaft and a nut-meat container of reticulated material carried by the shaft that is journaled in the bearings of said brackets.

11. In a cooker of the class described, the combination with a heated liquid container having a driving shaft mounted for operation at one end, of V-shaped brackets supported by the side walls of said container, the V-sides of said brackets converging into rounded portions forming bearings, a shaft journaled in said bearings, an elevating bar connected to said shaft, a nut container of reticulated material carried by the shaft that is journaled in the bearings of said brackets, and a means associated with said nut container for rotating the same.

In witness whereof, I have hereunto set my hand and seal at Los Angeles, California, this 28th day of April A. D. nineteen hundred and twenty-five.

RENE BARSAM. [L. S.]